April 12, 1927.
R. M. CAROTHERS
1,624,715
REGULATING SYSTEM
Filed Feb. 21, 1924
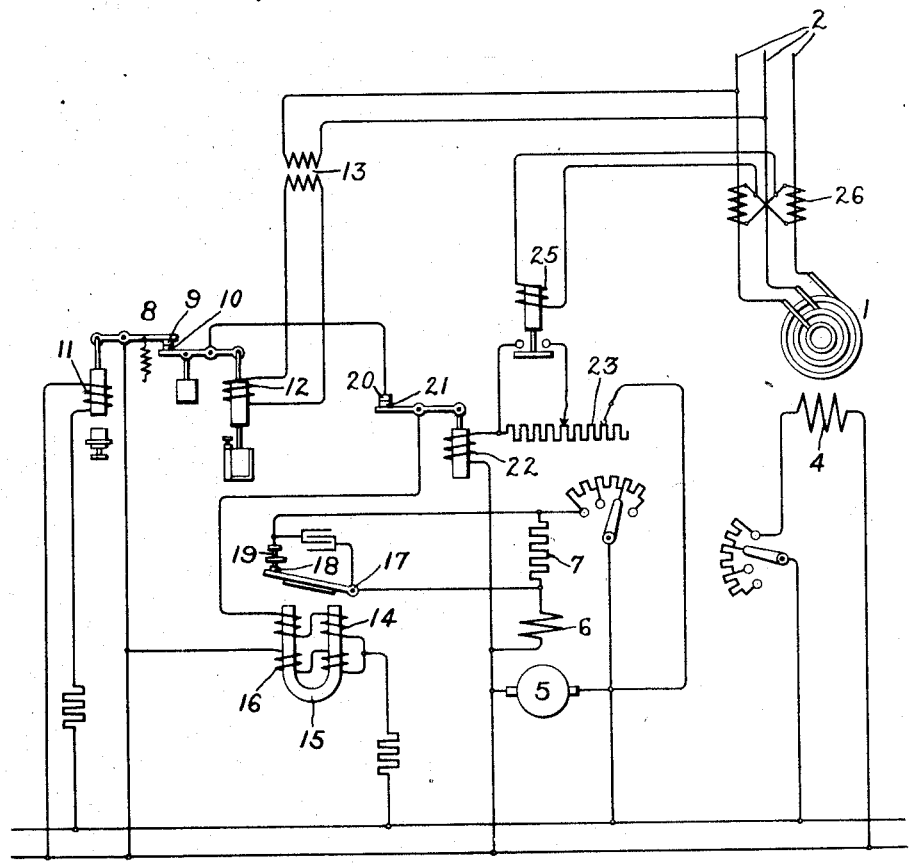
Inventor:
Robert M. Carothers:
by *Alexander S. ...*
His Attorney.

Patented Apr. 12, 1927.

1,624,715

UNITED STATES PATENT OFFICE.

ROBERT M. CAROTHERS, OF SCHENECTADY, NEW YORK, ASSIGNOR TO GENERAL ELECTRIC COMPANY, A CORPORATION OF NEW YORK.

REGULATING SYSTEM.

Application filed February 21, 1924. Serial No. 694,427.

My invention relates to regulating systems for controlling a characteristic of the output of a generator and particularly to a system in which the characteristic, which may be the voltage, current, power, power factor, etc., is controlled by varying the excitation of an exciter which supplies exciting current to the generator.

My invention is of particular utility in systems for controlling the voltage of the output of a generator. Since the voltage of a generator tends to decrease as the load connected thereto increases, the voltage regulator for a generator has to effect an increase in the excitation of the exciter as the load connected to the generator increases in order to maintain the voltage constant. Therefore when an overload or short circuit occurs, the voltage regulator operates to increase the excitation of exciter and thereby increase the current supplied to the overload or short circuit. It is desirable, however, that under such abnormal conditions the current supplied by the generator should be decreased instead of increased.

One object of my invention is to provide in a regulating system an improved arrangement for rendering the regulator inoperative to control the desired characteristic of the output of the generator when another characteristic of the output of the generator occurs.

In accordance with the preferred embodiment of my invention, I provide an arrangement whereby the voltage of the exciter is limited to a predetermined value when a certain characteristic of output of the generator occurs.

My invention will be better understood from the following description taken in connection with the accompanying drawing and its scope will be pointed out in the appended claims.

The accompanying drawing shows diagrammatically a voltage regulator of the well known Tirrill type, which embodies my invention.

Referring to the drawing, 1 represents a generator the voltage of which is to be maintained constant. As shown the generator 1 is an alternator which is connected to an alternating current circuit 2, but it is evident that my invention is not limited to any particular type of generator. The generator 1 is provided with a field winding 4 which is excited by a suitable source of current shown as an exciter 5. The exciter 5 is provided with a shunt field winding 6 and a resistance 7 in series therewith which is arranged to be short circuited by a Tirrill regulator 8.

The regulator 8, as shown, is of the well known construction comprising two cooperating contacts 9 and 10 which are respectively actuated by a direct current magnet 11 connected across the exciter 5 and an alternating current magnet 12 connected across the alternating current circuit 2 by means of a potential transformer 13. The two contacts 9 and 10 are connected in the circuit of one of the windings 14 of a differential magnet 15, this circuit being connected across the exciter 5. The other winding 16 of the differential magnet 15 is permanently connected across the exciter 5. The differential magnet 15 has a pivoted armature 17 which is arranged to close the contacts 18 and 19, when both of the windings 14 and 16 are energized, so as to short circuit the resistance 7 in the field circuit of the exciter 5. The operation of the regulator heretofore described is well known in the art. It is evident that the exciter voltage is controlled by the rapid opening and closing of the contacts 18 and 19 and that the value of the exciter voltage depends upon the length of time the contacts remain in engagement. Furthermore, it is evident that the length of time the contacts remain in engagement with each other depends upon the position of the contact 10, which in turn depends upon the load connected to the alternating current circuit. At any constant load the contact 10 remains stationary and the contact 9 vibrates so that the regulator acts as a direct current regulator to maintain the proper exciter voltage to produce the desired alternating current voltage. When the load on the generator increases, the voltage of the generator 1 tends to decrease so that the contact 10 moves towards the contact 9. Consequently the contacts 9 and 10 are in engagement a greater proportion of the time during each vibration of the contact 9. Therefore the resistor 7 is short circuited more of the time which in turn causes the exciter voltage to increase. When the exciter voltage reaches a value corresponding to that required to give normal alternating current voltage under the new load conditions, the alternating current magnet 12 remains stationary in its new position and the direct current magnet 11 then operates to maintain the exciter voltage at this higher value in order to hold the desired alternating current voltage. As the load on the generator increases, the contacts 9 and 10 move nearer and nearer together so that the resistor 7 is short circuited more of the time until finally, when a severe overload or short circuit occurs and the voltage of the line 2 decreases below its normal value, the contacts 9 and 10 remain in engagement with each other all of the time so that the exciter voltage builds up to its maximum value. Obviously, under such condition, the current supplied by the generator to the overload or short circuit may be sufficient to damage the generator. Therefore it is very desirable that suitable means should be provided for modifying the operation of the regulator under such abnormal conditions.

In order to accomplish this result, I provide in the circuit of the winding 14 of the differential magnet 15 another pair of the cooperating contacts 20 and 21, and arrange one of the contacts 21 so that it is actuated by a magnet 22 the winding of which is connected so as to be responsive to a predetermined electrical condition of the exciter which it is desired to maintain constant under the abnormal conditions. Preferably the winding is connected across the exciter 5 so as to be responsive to the voltage of the exciter. In series with the winding of the magnet 22, I provide a suitable current limiting device such as a resistor 23 so that the voltage impressed upon the winding of the magnet 22 is not sufficient to cause the contacts 20 and 21 to be separated under normal operating conditions.

In order to render the magnet 22 operative to control the excitation of the exciter under abnormal load conditions so as to limit the exciter voltage to a predetermined value, I provide an overload magnet 25 which is connected to two cross-connected transformers 26 in the alternating current circuit 2 supplied by the generator 1 and which is arranged to short circuit a portion of the resistor 23 when the current supplied by the generator exceeds a predetermined value. The amount of resistance in the circuit of the magnet 22, that the magnet 25 is arranged to short circuit, is such that the magnet 22 operates in response to a predetermined exciter voltage to separate the contacts 20 and 21 and thereby control the excitation of the exciter so as to maintain the voltage thereof at said predetermined value.

The operation of the regulating system shown is as follows. Under normal load conditions the contacts of the magnet 25 are open so that the pair of cooperating contacts 20 and 21 remain in engagement with each other and the voltage regulator 8 operates in a manner well known in the art to maintain the voltage of the generator 1 constant. When, however, a predetermined overload or short circuit occurs, which causes the contacts 9 and 10 to remain in engagement with each other, the relay 25 operates to short circuit a portion of the resistor 23 so that the magnet 22 is rendered operative to control the voltage of the exciter. Preferably the amount of resistance that is short circuited is such that the magnet 22 responds to a lower exciter voltage than the exciter voltage under normal full load conditions. It is evident, however, that the magnet 22 may be arranged to respond to any desired exciter voltage but my invention is of particular utility in a system where it is desirable to limit the exciter voltage under abnormal conditions to a value below the normal full load value.

After the magnet 25 operates, the magnet 22 actuates the contact 21 to open and close the circuit of the winding 14 of the differential magnet 15 so as to control the excitation of the exciter 5 in such a manner as to maintain the exciter voltage at a predetermined voltage so long as the current supplied by the generator is sufficient to maintain the contacts of the overload magnet 25 closed. As soon as the overload or short circuit is removed, the magnet 25 opens its contacts and all of the resistance 23 is again connected in series with the winding of the magnet 22. The cooperating contacts 20 and 21 then remain closed and the voltage regulator 8 operates in the usual manner to control the voltage of generator 1.

It will be obvious to those skilled in the art that, while my invention is particularly applicable to a regulating system in which the voltage is the characteristic of the output which renders the regulator inoperative to maintain the voltage at its normal value, in its broader aspects my invention relates to a regulating system in which other characteristics of the output may be used to control the operation of the regulator. Therefore, while I have shown and described only one embodiment of my invention, I do not desire to be limited thereto but seek to cover in the appended claims all those embodiments and modifications thereof that fall within the true spirit and scope of my invention.

What I claim as new and desire to secure by Letters Patent of the United States is:—

1. In a regulating system, a generator, an exciter therefor, means operative in response to a characteristic of the output of said generator for controlling the excitation of said exciter, means operative in response to an electrical condition of said exciter for controlling the excitation thereof, and means operative in response to another characteristic of the output of said generator for controlling the operation of said means which is responsive to an electrical condition of said exciter.

2. In a regulating system, a generator, an exciter therefor, means operative in response to the voltage of said generator for controlling the excitation of said exciter, means operative in response to the voltage of said exciter for modifying the operation of said first mentioned means, and means operative in response to a predetermined amount of current supplied by said generator for controlling the operation of said means which is responsive to the exciter voltage.

3. In a regulating system, a generator, an exciter therefor, a pair of cooperating contacts, a magnet operative in response to a characteristic of the output of said generator for actuating one of said contacts, a magnet arranged to control the excitation of said exciter, a circuit for said last mentioned magnet controlled by said cooperating contacts, another pair of cooperating contacts connected in said circuit, a magnet for actuating one of the contacts of said last mentioned pair of cooperating contacts in accordance with an electrical condition of said exciter, and means operative in response to another characteristic of the output of said generator for controlling the operation of said last mentioned magnet.

4. In a regulating system, a generator, an exciter therefor, a pair of cooperating contacts, a magnet operative in response to the voltage of said generator for actuating one of said contacts, a magnet arranged to control the excitation of said exciter, a circuit for said last mentioned magnet controlled by said cooperating contacts, another pair of cooperating contacts connected in said circuit, a magnet for actuating one of said last mentioned pair of cooperating contacts, a circuit for last mentioned magnet connected across said exciter, current limiting means in said last mentioned circuit, and means operative in response to a predetermined amount of current supplied by said generator for short circuiting said current limiting means.

5. In a regulating system, a gnerator, an exciter therefor, a pair of cooperating contacts, a magnet operative in response to the voltage of said generator for actuating one of said contacts, a magnet operative in response to the voltage of said exciter for actuating the other one of said contacts, a magnet arranged to control the excitation of said exciter, a circuit for said last mentioned magnet arranged to be compléted when said cooperating contacts are in engagement, another pair of contacts in said circuit, a magnet for actuating one of said last mentioned pair of cooperating contacts, a circuit for said last mentioned magnet connected across said exciter, current limiting means connected in series with said last mentioned circuit, and a magnet operative in response to a predetermined current supplied by said generator for short circuiting said current limiting means so that said last mentioned magnet operates to limit the exciter voltage when the load connected to said generator exceeds a predetermined value.

In witness whereof, I have hereunto set my hand this 19th day of February, 1924.

ROBERT M. CAROTHERS.